April 24, 1945. W. BOREK 2,374,325

PRECISION TOOL HOLDER FOR BORING MACHINES AND THE LIKE

Filed Aug. 11, 1943

INVENTOR
WALTER BOREK
by Owen W. Kennedy
ATTORNEY

Patented Apr. 24, 1945

2,374,325

UNITED STATES PATENT OFFICE 2,374,325

PRECISION TOOLHOLDER FOR BORING MACHINES AND THE LIKE

Walter Borek, Worcester, Mass.

Application August 11, 1943, Serial No. 498,166

4 Claims. (Cl. 77—56)

The present invention relates to machine tools and particularly to an improved tool holder for use in connection with a boring bar, as utilized in horizontal or vertical boring machines, drilling machines and the like.

One of the objects of the present invention is to provide a tool holder for machines of the above indicated character, whereby the tool may be conveniently and accurately adjusted and its adjustment can be positively maintained for successive boring operations. A further object of the invention is to provide a tool holding construction of such character that the cutting tool itself may be readily replaced when worn out, with the amount of metal in the discarded tool being held to a minimum.

The above and other advantageous features of the invention will hereinafter more fully appear from the following description, considered in connection with the accompanying drawing, in which Fig. 1 is a view in side elevation of a portion of a boring bar provided with a tool holder embodying the invention.

Figure 2:
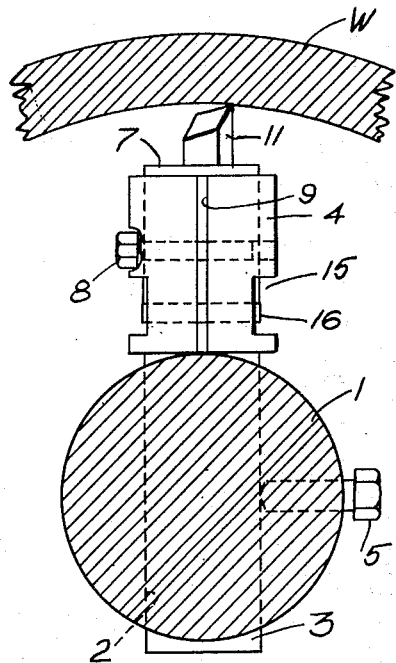
Fig. 2 is a transverse sectional view along the line 2—2 of Fig. 1, looking in the direction of the arrows.

For purposes of illustration, the invention is shown as applied to a boring bar 1 of conventional form, rotatable about its axis with respect to a cylindrical work-piece W and providing a transverse slot 2 for receiving the shank 3 forming part of a tool holder which provides an enlarged head 4 projecting from one side of the bar 1. The tool holder is clamped in position on the boring bar 1 by means of a set screw 5 extending transversely through the boring bar to engage the holder shank 3, as best shown in Fig. 2.

The tool holder head 4 provides a cylindrical opening 6 for receiving a cylindrical tool socket 7 and the socket 7 is adapted to be clamped within the head 4 by means of a screw 8 extending transversely across a slot 9 extending the length of the opening 6, so that turning of the screw 8 will tend to contract the walls of the opening 6 upon the socket 7.

Figure 3:
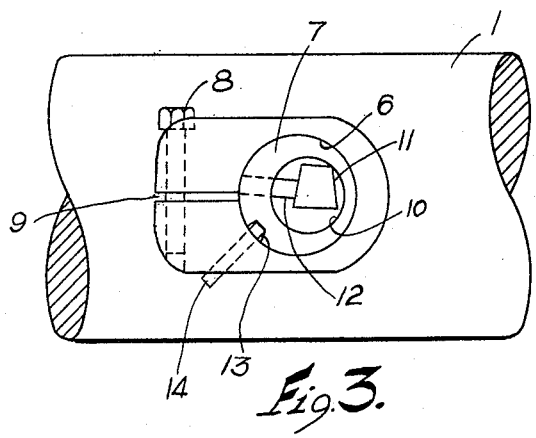
Fig. 3 is a plan view of the parts shown in Fig. 1.
Figure 4:
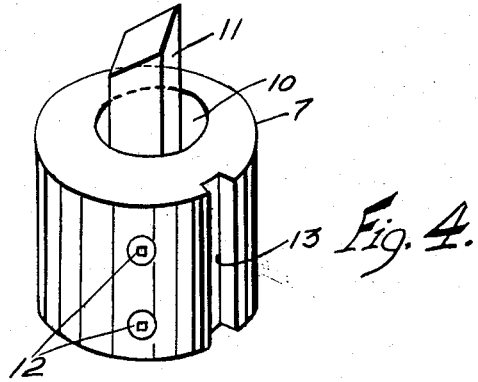
Fig. 4 is a perspective view on an enlarged scale of a tool socket removed from the holder.

As best shown in Fig. 4, the socket 7 provides an opening 10 for receiving a cutting tool 11, with the tool 11 being held in position within the opening 10 by means of screws 12. The heads of the screws 12 are countersunk within the socket 7 so that the latter presents a smooth cylindrical outside surface adapted to fit closely within the opening 6 of the head 4. The tool socket 7 also provides an external slot 13 which receives the end of a screw 14 projecting into the opening 6, as shown in Fig. 3, in order to always properly position the tool 11 carried by the socket 7 when the latter is inserted in the opening 6 of the holder.

Figure 5:
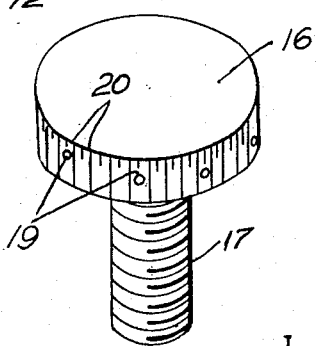
Fig. 5 is a perspective view of the adjusting member which cooperates with the tool socket of Fig. 4.

When the socket 7 carrying the tool 11 is assembled in the holder head 4, the lower end of the socket extends into a cross slot 15 provided by the head 4 in communication with the opening 6. In this position the lower end of the socket 7 is in engagement with the upper face of an adjusting member 16 which, as best shown in Fig. 5, is in the form of a circular disk having substantially the same diameter as the socket 7. The adjusting member 16 further provides a threaded portion 17 received in a similarly threaded opening 18 extending downwardly through the head 4 into the shank 3. The existence of the cross slot 15 exposes the periphery of the adjusting member 16, which provides a number of tool receiving openings 19 so that the adjusting member may readily be turned within the holder.

Figure 1:
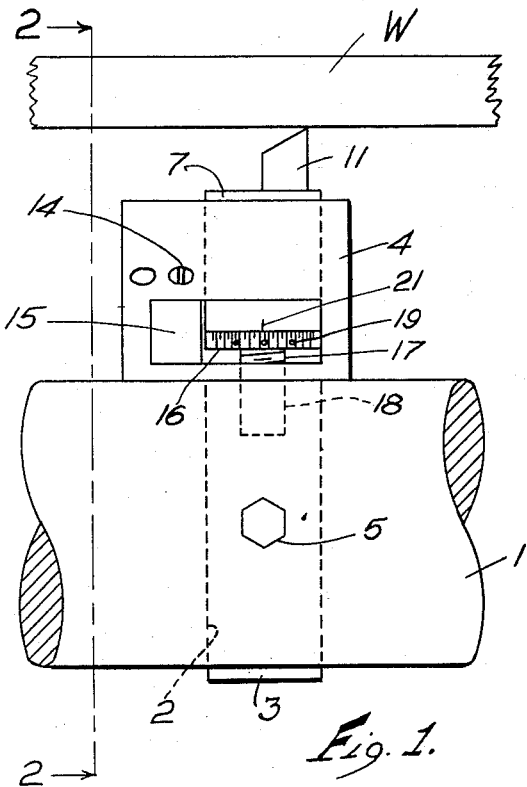

When the parts of the tool holder are initially set up for the performance of a cutting operation, the adjusting member 16 is turned down into the opening 18 so that it occupies the position of Fig. 1. The tool socket 7 is then clamped in position by the screw 8, with the entire tool holder assembly then being rotatable with the boring bar by reason of the clamping of the holder shank 3 within the bar slot 2.

Figure 6:
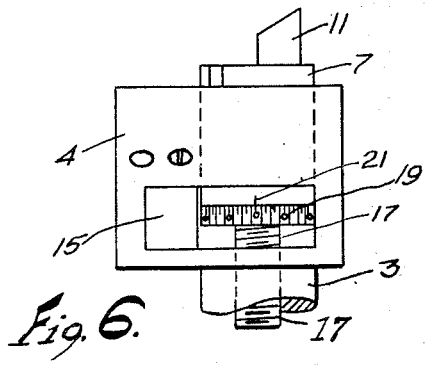
Fig. 6 shows the tool holder of Fig. 1 following an adjustment of the tool therein.

Assuming that a cut has been taken with the initial set up of the tool 11 as shown in Fig. 1 and it is desired to feed the tool outwardly for a further cut, it is only necessary to turn the adjusting member 16 by means of a suitable tool inserted in any one of the openings 19. Such turning of the member 16 forces the tool socket 7 outwardly from within the holder, as indicated on a somewhat exaggerated scale in Fig. 6. Obviously, the amount that the cutting nose of the tool 11 is fed outwardly can be controlled very accurately, even to one or two thousandths of an inch, due to the fact that the slightest turning of the adjusting member 16 will cause a correspondingly slight movement of the tool socket 7.

As an aid in definitely determining the amount of adjustment imparted to the tool 11, the periphery of the adjusting member 16 provides a number of graduated scale markings 20 which may be calibrated with reference to an index mark 21 on the socket 7. Since this index mark 21 always occupies the same position with reference to the head 4 by reason of the slot 13 and screw 14, the markings 20 can be read directly so as to indicate the actual distance that the tool 11 has been moved outwardly for the next cut.

Whenever it is desired to remove the tool 11 for purposes of sharpening or renewing the same, the tool socket 7 can be readily withdrawn from the holder head 4 upon loosening the screw 8. It is then a simple matter to remove the tool itself from the socket 7 by loosening the tool holding screws 12. Obviously, the amount of metal in the cutting tool 11 is reduced to a minimum by the present construction so that there is very little waste of metal when a tool is discarded.

I claim:

1. A cutting mechanism for machine tools comprising in combination, a rotary tool carrying shaft providing an opening extending at right angles to the shaft axis, a tool holder having a portion thereof received in said shaft opening and an enlarged portion extending beyond the shaft, a tool socket removably mounted in said enlarged portion, said socket providing means for clamping a cutting tool therein, and an adjusting member in threaded relation with said holder for engaging the inner end of said tool socket and thereby determining the extent to which the cutting point of said tool projects beyond the axis of said shaft.

2. A cutting mechanism for machine tools comprising in combination, a rotary tool carrying shaft providing an opening extending at right angles to the shaft axis, a tool holder having a portion thereof received in said shaft opening and an enlarged portion extending beyond the shaft, a tool socket removably mounted in said enlarged portion, said socket providing means for clamping a cutting tool therein, and an adjusting member having one portion in threaded relation with said holder and another enlarged portion in abutting relation with the end of said tool socket, with said latter portion providing graduated scale markings to indicate the extent of movement imparted to said tool socket by turning of said adjusting member.

3. A tool holder for boring machines and the like, comprising a shank for mounting in a rotatable boring bar, an enlarged head extending beyond the shank providing an opening, a socket receivable in said head opening and providing means for removably securing a tool therein, means for clamping said tool socket within the holder for a predetermined setting of said tool, and an adjusting member in threaded relation with the shank of said holder for engaging said tool socket, said adjusting member being turnable with respect to said socket for feeding the latter outwardly with respect to the axis of rotation of the boring bar.

4. A tool holder for boring machines and the like, comprising a shank for mounting in a rotatable boring bar, an enlarged head extending beyond the shank providing an opening, a socket receivable in said head opening and providing means for removably securing a tool therein, means for clamping said tool socket within the holder for a predetermined setting of said tool, and an adjusting member in threaded relation with said holder for engaging the inner end of said tool socket, said adjusting member being accessible through a slot provided by said head and providing scale markings to indicate the extent of movement imparted to said tool socket as a result of turning said adjusting member.

WALTER BOREK.